United States Patent [19]

Campbell

[11] 4,322,054
[45] Mar. 30, 1982

[54] PINCH VALVE

[75] Inventor: James A. Campbell, Monroeville, Pa.

[73] Assignee: Red Valve Company, Inc., Carnegie, Pa.

[21] Appl. No.: 220,464

[22] Filed: Dec. 29, 1980

[51] Int. Cl.³ .................................................. F16K 7/07
[52] U.S. Cl. ........................................... 251/5; 251/7
[58] Field of Search .................................... 251/5, 7, 10

[56] References Cited

U.S. PATENT DOCUMENTS

| | | | |
|---|---|---|---|
| 2,770,439 | 11/1956 | Stafford et al. | 251/5 |
| 3,078,675 | 2/1963 | Baldwin | 251/5 |
| 3,491,983 | 1/1970 | Van Damme et al. | 251/5 |
| 3,695,576 | 10/1972 | Kane et al. | 251/5 |
| 3,740,017 | 6/1973 | Pogonowski | 251/5 |
| 4,081,170 | 3/1978 | Doss, Jr. | 251/5 |
| 4,172,580 | 10/1979 | Raftis et al. | 251/7 |

Primary Examiner—H. Jay Spiegel
Attorney, Agent, or Firm—Kirschstein, Kirschstein, Ottinger & Cobrin

[57] ABSTRACT

A double acting pinch valve with floating pinch mechanism. Two opposed rectilinear rigid members extend transversely to a flexible deformable resilient sleeve and on opposite sides of the sleeve; the flow of fluid to be controlled is through the sleeve from one end to the other. A floating piston is provided in a container, i.e. in a cylinder, which container or cylinder also has a floating mounting and suspension. The piston rod is rigidly connected to one of the rigid members, and the floating container is rigidly connected to the other rigid member. The two rigid members and the container with integral piston all have, as a feature of the invention, a floating mounting and suspension on a frame on which the sleeve is mounted, so that these elements are freely displaceable relative to the frame and towards or away from the sleeve. When a fluid is passed into the container between its outer closed end and the piston head, the closed end, and for that matter the entire container, and the piston head, are both concomitantly displaceable in opposite directions away from each other, so that both rigid members are concomitantly displaceable towards each other in a convergence which pinches the sleeve and curtails or terminates fluid flow through the sleeve. The sleeve is concomitantly pinched on both sides, by both of the opposed rigid members.

2 Claims, 4 Drawing Figures

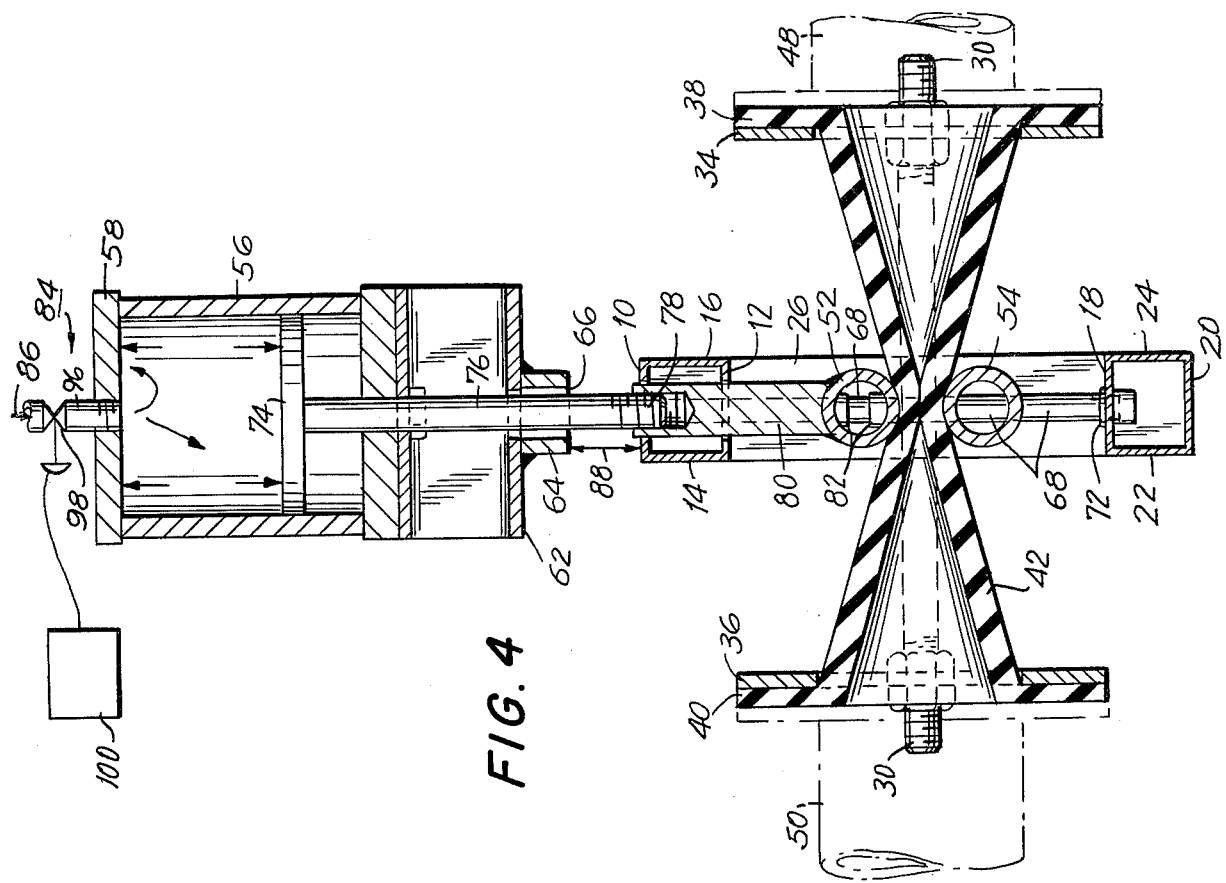
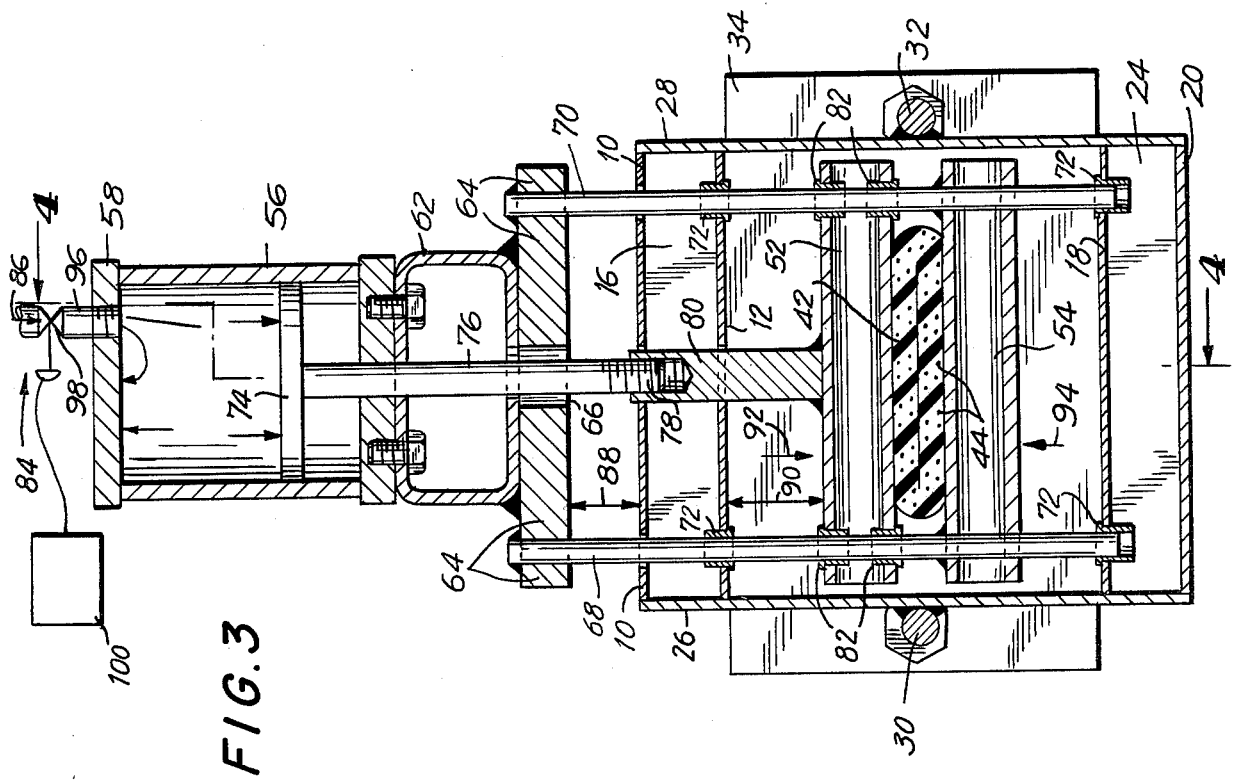

PINCH VALVE

BACKGROUND OF THE INVENTION

1. Field of the Invention

A pinch valve for modulating, throttling and curtailing or terminating the flow of a fluid.

2. Description of the Prior Art

Pinch valves basically consist of a flexible resilient cylindrical elastomeric sleeve or the like which is interposed in a continuous conduit, duct, pipe or tube, together with means to constrict the sleeve so as to curtail, terminate or control the flow of fluid through the conduit or the like. In most instances, the sleeve is concentrically oriented within an outer rigid valve housing, and means are provided to impress a fluid under pressure between the sleeve and the housing so that the sleeve is squeezed inwards and deformed or collapsed to provide a smaller fluid flow passage. In other instances, mechanical means are provided to pinch the sleeve to accomplish the same result. One problem encountered with pinch valves of the prior art is a tendency of the joints between the sleeve and/or the valve housing, and the continuous lengths of conduit or the like, to ultimately leak due to distortion of the sleeve and repeated flexing of the same.

Normally, a pinch valve sleeve is made from pure gum rubber, neoprene, BUNA, butyl, hypalon, urethane, viton, EPT (nordel), silicone and food grade rubber. Typically, any suitable flexible and resilient (and usually corrosion-resistant) material of construction may be employed for the sleeve. However, a synthetic rubber such as hypalon, BUNA, neoprene, a deformable plastic, or natural rubber are preferred. The flexible and resilient sleeve will in general be resiliently deformable and will be composed of any suitable material such as those mentioned supra. In this regard, it will be understood by those skilled in the art that any rubbery or rubber-like elastic material may be employed to fabricate the sleeve. Thus, hypalon is defined as a rubber material obtained by the chlorination and sulfonation of polyethylene. BUNA is defined as a rubber substitute prepared by the polymerization or copolymerization of butadiene. Neoprene is defined as polychloroprene made by the polymerization of chloroprene, i.e. neoprene is a generic name for synthetic rubber made by polymerization of 2-chloro-1,3-butadiene (prepared by the action of hydrogen chloride on monovinylacetylene).

Pinch valve constructions, as generally described herein, have been used in a wide variety of situations. More specifically, pinch valve constructions as described herein have been used in controlling the flow of, by way of example, solids in suspension (either in slurry or air-conveyed form), especially abrasive materials such as metallic ores, asbestos, fibers, sand, coal, sugar, wood chips or pulps, paper stock, plastic pellets, raw sewage, talc, cement, fly ash, and various chemicals and foodstuffs.

Among the prior art relating to pinch valve constructions may be mentioned U.S. Pat. Nos. 4,172,580; 4,125,125; 3,838,704; 3,483,892; 3,445,085; 3,441,245; 3,396,448; 3,371,677; 3,272,470; and 3,159,373; U.S. patent application Ser. No. 118,921 filed Feb. 6, 1980; German Pat. No. 1,038,850; British Pat. No. 639,646 and Italian Pat. No. 535,034; and U.S. patent application Ser. No. 967,842 filed Dec. 8, 1978.

SUMMARY OF THE INVENTION

1. Purposes of the Invention

It is an object of the present invention to provide an improved pinch valve construction.

Another object is to provide a pinch valve which is rugged and reliable in operation and is of low cost.

A further object is to provide a pinch valve which is readily and simply fabricated and assembled in mass production facilities using unskilled labor.

An additional object is to provide a pinch valve which has good performance characteristics.

Still another object is to provide a pinch valve which is simpler than, but works as well as, prior art designs of greater complexity.

Still a further object is to provide a pinch valve which is competitive in performance and cost to known pinch valves now on the market.

Still an additional object is to provide an improved pinch valve construction for modulating, throttling, controlling, curtailing or completely terminating the flow of a fluid through a continuous tube, pipe, duct, conduit or the like.

An object is to provide an improved double acting pinch valve with totally floating pinch mechanism.

An object is to provide a double acting pinch valve in which opposed rigid members on opposite sides of the flexible deformable resilient sleeve are concomitantly displaceable towards each other, in a convergence which pinches both sides of the sleeve and curtails or terminates the fluid flow through the sleeve.

An object is to provide a double acting pinch valve which has only one cylinder or container with integral piston, yet which pinches the sleeve from both directions, i.e. on both sides.

An object is to provide a double acting pinch valve having only one cylinder, in which the cylinder can be undersized by up to 50% relative to prior art configuration.

An object is to provide a double acting pinch valve in which both the cylinder or container, and the integral piston, are mounted via floating mountings, so that both the cylinder or container, and the piston, move in opposite directions, either to pinch the sleeve or to relieve the pinching of the sleeve.

An object is to provide a double acting pinch valve in which the last 10% of closure of the sleeve is relatively easy to accomplish, because of the double acting floating pinch mechanism.

These and other objects and advantages of the present invention will become evident from the description which follows.

2. Brief Description of the Invention

The pinch valve of the present invention includes a unique double acting floating pinch mechanism, which features a floating cylinder or container, as well as a floating piston. By the term "floating" it is meant to convey the concept of a configuration in which a member has a floating mounting and suspension on a rigidly fixed member, e.g. a frame for the sleeve, so that the floating member is freely displaceable relative to, and typically towards or away from, the rigidly fixed member. The mounting of the floating member usually consists of centering bushings that the rigid members, i.e. the mountings of the pinch bars, ride on in a generally rectilinear path of motion towards or away from the sleeve.

The present double acting pinch valve with floating pinch mechanism includes a frame and a flexible deformable resilient usually cylindrical sleeve. Typically the sleeve is composed of a flexible resilient material such as neoprene, Buna-N, hypalon, pure gum rubber, butyl, EPT (nordel), viton, food grade rubber, urethane, silicone or a deformable plastic such as polyethylene, polypropylene, especially isotactic polypropylene, or polyvinylchloride. The material of the sleeve in any case may be reinforced with integral internal threads of a fiber such as nylon, rayon, cotton, woven steel wire, or woven aluminum wire.

The frame constitutes a rigidly fixed member and may be viewed as a valve body, and the sleeve is mounted on the frame. Means such as a fluid inlet pipe coaxially attached to one end of the sleeve and a fluid outlet pipe coaxially attached to the other end of the sleeve, is provided to pass a fluid stream through the sleeve, so that fluid flow through the pipes may be controlled, e.g. curtailed, modulated, throttled or terminated, by the pinching of the sleeve.

A first usually rectilinear and cylindrical rigid member extends usually transversely to the sleeve external to and on one side of the sleeve, and a second usually rectilinear and cylindrical rigid member extends usually transversely to the sleeve external to and on the other side of the sleeve opposite to the one side; typically, the two rigid members are parallel and in registration, straddling the sleeve and being contiguous with the sleeve.

A rectilinear rigid usually cylindrical container or cylinder is juxtaposed with the first rigid member and spaced away from the one side of the sleeve. The container has an end which is closed and spaced away from the sleeve. The container is rigidly connected to the second rigid member.

A piston having a generally circular head and a connecting rod is disposed in conjunction with the aforementioned container or cylinder, with the piston head being mounted within the container and with the rod being rigidly connected to the first rigid member.

A salient aspect of the invention is that the first and second rigid members, and the container or cylinder with integral movable piston, have a floating mounting or suspension on the frame, so that the first and second rigid members, container, and piston are freely displaceable relative to the frame and towards or away from the sleeve.

Means is provided to pass a fluid such as air, water, a hydrocarbon oil, a silicone oil, or a hydraulic brake fluid into the container or cylinder between the closed one end and the piston head, so that the closed end and the piston head are both concomitantly displaceable away from each other. Consequently, both the container and the piston with integral connecting rod are concomitantly displaceable in opposite directions away from each other, so that both the first rigid member and the second rigid member are concomitantly displaceable towards each other in a convergence which pinches the sleeve on both sides, and curtails or terminates the flow of fluid through the sleeve. Thus, the sleeve is pinched on both the one side and the other side opposite to the one side, by both the first rigid member and the second rigid member.

Relieving the fluid pressure in or into the cylinder or container will automatically cause the valve sleeve to either partially or fully open, both because of the fluid pressure of the fluid flowing inside the sleeve, and also because of the flexible resilient nature of the sleeve.

In summary, the present pinch valve is unique because it has one cylinder to pinch from both directions. Thus, the cylinder can be undersized by up to about 50%; because the last 10% of closure, if pinching from the top only as in the prior art, is very difficult, and a great deal of thrust is needed, because of such considerations as the nylon reinforcing of the sleeve working against deformation of the sleeve to a total pinch closure.

The present double acting pinch valve with floating pinch mechanism provides many salient advantages. The last 10% of closure of the sleeve is relatively easy to accomplish as contrasted to prior art configurations, because of the double acting floating pinch mechanism. In the present double acting pinch valve, both the cylinder or container, and the integral piston, are mounted via floating mountings, so that both the cylinder or container, and the piston, move concomitantly in opposite directions, either to pinch the sleeve, or to relieve the pinching of the sleeve. An important advantage is that the present pinch valve has only one cylinder, and this one cylinder can be undersized by up to about 50% relative to prior art configurations, because the pinch valve is double acting with a totally floating pinch mechanism. Thus the present pinch valve has only one cylinder or container, yet the sleeve is pinched from both directions, i.e. on both sides. The present pinch valve provides two floating double acting opposed rigid members on opposite sides of a flexible deformable resilient sleeve, which two members are concomitantly displaceable towards each other, in a convergence which pinches both sides of the sleeve, and effectively curtails or terminates the fluid flow through the sleeve without necessitating the application of excessive force to the sleeve in the pinching, or the excessive consumption of energy, or excessive generation of stress on the sleeve.

Other advantages include the fact that the present pinch valve is rugged and reliable in operation, and is of low cost. The valve is readily and simply fabricated and assembled in mass production facilities using unskilled labor. The present pinch valve has good performance characteristics. The valve is simpler than, but works as well as, prior art designs of greater complexity. The present pinch valve is competitive in performance and cost to known pinch valves now on the market. The present valve is an improved double acting pinch valve with totally floating pinch mechanism, and is an improved valve construction for modulating, throttling, controlling, curtailing or completely terminating the flow of a fluid through a continuous tube, pipe, duct, conduit or the like.

The invention accordingly consists in the features of construction, combination of elements, and arrangement of parts which will be exemplified in the device and article of manufacture hereinafter described, and of which the scope of application is as elucidated supra and as will be indicated in the appended claims.

BRIEF DESCRIPTION OF THE DRAWINGS

In the accompanying drawings in which is shown one of the various possible embodiments of the invention:

FIG. 3 is similar to FIG. 2 but shows the valve totally closed with the sleeve pinched shut; and FIG. 4 is a sectional elevation view taken substantially along the line 4—4 of FIG. 3.

DETAILED DESCRIPTION OF THE PREFERRED EMBODIMENTS

Figure 2:
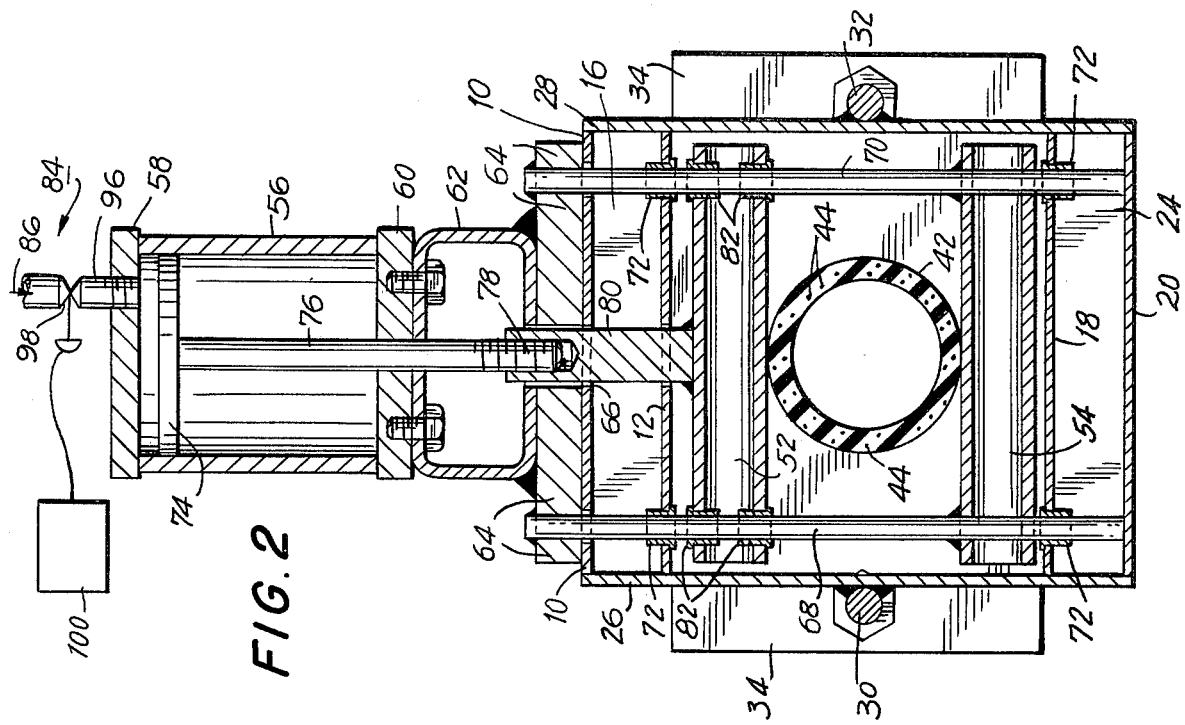
FIG. 2 is a sectional elevation view of the valve taken substantially along the line 2—2 of FIG. 1, and showing the valve sleeve totally open and unpinched.

Referring now to the Figures, and especially FIG. 4, the double acting pinch valve with floating pinch mechanism basically includes a fixed rigid frame constituting a housing or valve body, and composed of a fixed central upper parallelepiped box structure having upper rigid horizontal plate member 10 and lower rigid horizontal plate member 12, as well as lateral vertical plate members 14 and 16; a fixed lower parallelepiped box structure having upper rigid horizontal plate member 18 and lower rigid horizontal plate member 20, as well as lateral vertical plate members 22 and 24; and lateral rigid vertical connecting plate members 26 and 28, which are attached as by welding, as shown, to respective horizontal assembly connecting bolts 30 and 32; the bolts 30 and 32 having threaded ends, so that these ends may be secured by nuts, as shown, to terminal mounting plate members 34 and 36, so as to maintain a rigid structure.

The plate members 34 and 36 serve also as mounting plates for the respective end flanges 38, 40 of a flexible deformable resilient sleeve 42, so that the sleeve 42 is mounted to the frame structure as described supra. The sleeve 42, when fully opened as shown in FIG. 2, is of a generally cylindrical configuration, and the sleeve 42 is typically composed of a flexible resilient material such as neoprene, Buna-N, hypalon, pure gum rubber, butyl, EPT (nordel), viton, food grade rubber, urethane, silicone or a deformable plastic such as polyvinyl chloride, polyethylene, or polypropylene, especially isotactic polypropylene. As seen in FIGS. 2 and 3, the material of the sleeve 42 is reinforced, in this embodiment of the invention, with integral internal threads 44 of a fiber such as nylon, rayon, cotton, woven steel wire, or woven aluminum wire.

As shown in phantom outline, means is provided to pass a fluid stream 46 through the sleeve 42, the means including a flanged inlet tube, pipe, duct or conduit 48 and a flanged outlet tube, pipe, duct or conduit 50, both seen in phantom outline as connected to and linked up with the respective end flanges 38 and 40 of the sleeve 42. Thus, in the mounting of the sleeve 42, its end flanges 38 and 40 are held between the respective plates 34 or 36 and associated respective flanges of conduits 48 or 50, see FIGS. 1 and 4.

An upper first rigid member 52, consisting in this case of a hollow rectilinear cylindrical pinch rod or bar, extends generally transversely to the sleeve 42, i.e. the central longitudinal axis of the pinch bar 52 is transverse to the central longitudinal axis of the sleeve 42. The pinch bar 52 is disposed contiguously on one side of the sleeve 42; in this case the pinch bar 52 is horizontally disposed immediately above and transverse to the generally horizontal sleeve 42.

A lower second rigid member 54, consisting in this case of another hollow rectilinear cylindrical pinch rod or bar, extends generally transversely to the sleeve 42 but below the sleeve 42, i.e. the central longitudinal axis of the pinch bar 54 is transverse to the central longitudinal axis of the sleeve 42. The pinch bar 54 is disposed contiguously on the other or opposite side of the sleeve 42 relative to the pinch bar 52, thus in this case the pinch bar 54 is horizontally disposed immediately below and transverse to the generally horizontal sleeve 42. As will appear infra, convergence of the pinch bars 52 and 54, which are parallel to each other and in registration, so that the bars 52 and 54 move towards each other, is how the pinching of the sleeve 42 is accomplished.

A rectilinear rigid, generally cylindrical and vertically oriented container 56, which may also be termed a cylinder 56, is juxtaposed above, and adjacent to, the first rigid member or upper pinch bar 52, and the container 56 is spaced away from the upper side of the sleeve 42, as best seen in FIG. 2. The container 56 has a disc-shaped outer end closure 58 which is spaced away from the sleeve 42. In addition, the container 56 is rigidly connected to the second rigid member or lower pinch bar 54. This rigid connection is attained by way of the provision of a vertical succession of members which are either bolted or welded together. Starting with the upper container 56, these members are lower disc-shaped container closure plate 60, hollow, rectangular, paralleliped mounting sleeve 62, rectangular support plate 64 having a central through opening 66, and lateral, vertical support rods 68 and 70 which are both attached by welding to both the upper plate 64 and the lower pinch bar 54. The rods 68 and 70 ride vertically up and down on centering bushings 72, so that vertical movement of the floating container 56 causes concomitant vertical movement of the lower pinch bar 54, because these two elements are rigidly attached to each other by virtue of the several connecting elements 60,62,64,68 and 70 as described supra, all of which are either bolted or welded into a unitary, rigidly connected entity, which floats on the centering bushings 72 and the lower side of the sleeve 42. It is to be noted that the centering bushings 72 are affixed and mounted in fixed and rigid frame members 12 and 18.

A piston is provided having a typically circular piston head 74 within the container 56, and a connecting rod 76 which extends vertically downwards from the head 74 and through the opening 66 to a threaded lower end 78, by which the connecting rod is attached to a vertical linkage bar 80 which is attached, as by welding, to the upper surface of the upper pinch bar 52, so that the head 74 of the piston is mounted within the container 56 while the connecting rod 76 of the piston is rigidly connected to the first rigid member or upper pinch bar 52. This upper pinch bar 52 floats on the upper side of the sleeve 42, and bar 52 is positioned and tracked into an upwards and downwards, vertical movement by means of lateral openings provided with centering bushings 82, i.e. the rods 68 and 70 extend through these lateral openings in the upper bar 52, so that bar 52 can concomitantly move up or downwards as the rods 68 and 70 move respectively downward or upwards.

It thus is apparent, that the first and second rigid members, i.e. upper pinch bar 52 and lower pinch bar 54, as well as the container 56 with integral piston consisting of head 74 and connecting rod 76, have a floating mounting and suspension on the rigidly fixed valve body, frame or valve housing, so that the first and second members, container and piston are freely displaceable relative to the frame and towards or away from the sleeve 42. It is evident from the description supra, that the lower pinch bar 54 moves in conjunction with the container 56, and that the upper pinch bar 52 moves in conjunction with the piston head 74 and connecting rod 76, all of these members having a floating mounting and suspension on the frame of the device, while the aforementioned members are characterized in that those members which move in conjunction with each other, do so by virtue of a rigid connection and mounting to each other albeit they have a floating mounting and suspension to the frame or rigid body of the device.

The present double acting pinch valve with floating pinch mechanism, is completed in this embodiment of the invention by the provision of means, generally designated as 84, to pass a fluid stream 86 consisting of, e.g. air, water, a hydrocarbon oil, a silicone oil or a hydraulic brake fluid, into the container 56, in this case through the upper closed end 58, and in any case between the closed end 58 and the piston head 74, so that the closed end 58 and the piston head 74 are both concomitantly displaceable away from each other, see FIGS. 3 and 4. These FIGS. 3 and 4 clearly show how both pinch bars 52 and 54 bear against the sleeve 42 to pinch the sleeve 42 completely shut, and to close off the flow of fluid stream 46. It is to be noted, that the flexible, resilient sleeve 42 is uniformly and generally equally deformed both from the top via bar 52 and from the bottom via bar 54. Thus, the force and pressure of fluid stream 86 is exerted via the floating members and against the resistance of both the deformable and resilient sleeve 42 and the fluid pressure of stream 46 within sleeve 42.

The mode of action illustrated in FIGS. 3 and 4 shows, via the arrows, how and when the fluid stream 86 is admitted into the cavity formed by end 58, container 56 and plate 60, the closed end 58 and the piston head 74 are both comcomitantly displaceable away from each other, whereby both the container 56 and the piston 74,76 are concomitantly displaceable in opposite directions away from each other. Thus, the container 56 and appurtenances thereto move upwards, so that there is a gap 88 developed between the members 64 and 10, while concomitantly the piston 74,76 and appurtenances thereto move downwards, so that there is a large gap 90 developed between the members 12 and 52, as contrasted to the smaller gap shown in FIG. 2.

Figure 1:
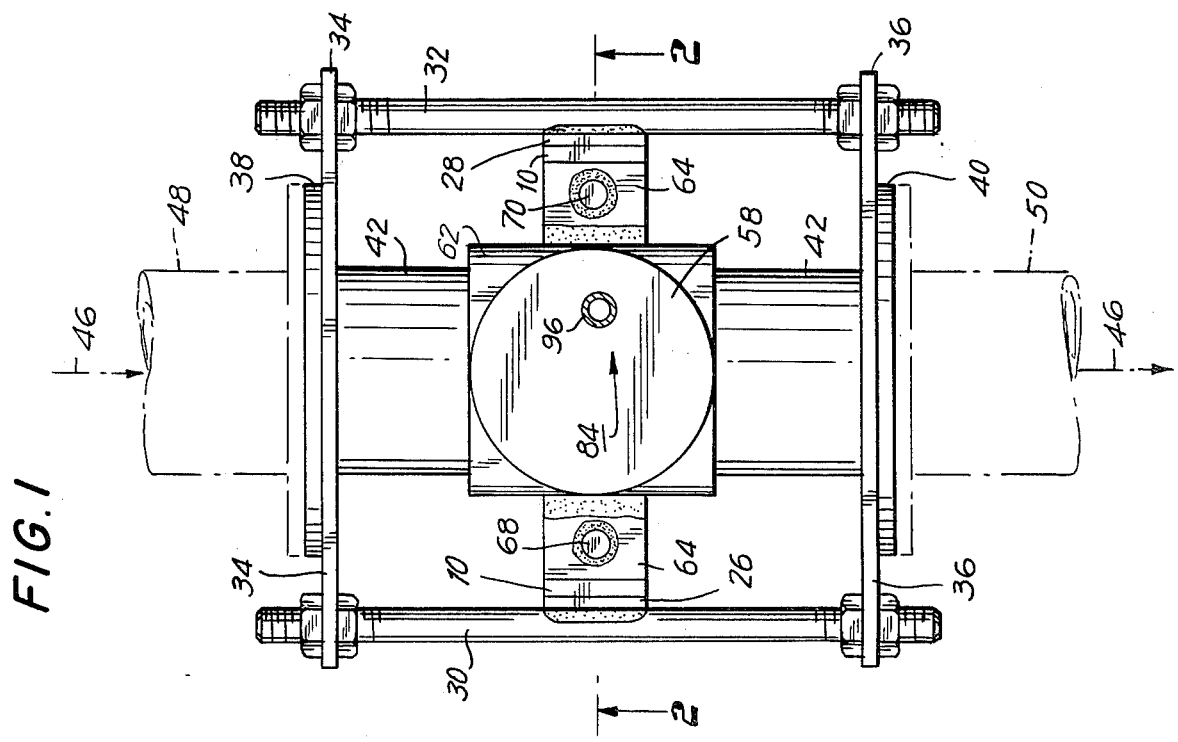
FIG. 1 is a top plan view of the present pinch valve.

Thus, what is accomplished in FIGS. 3 and 4 as contrasted to FIGS. 1 and 2, is that both the first rigid member (upper pinch bar 52) and the second rigid member (lower pinch bar 54) are concomitantly displaced towards each other in a convergence which has pinched the sleeve 42, both from the top side and the bottom side, and which has thus curtailed, and in this case terminated, the flow of fluid stream 46 through the sleeve 42, with both the first rigid member 52 and the second rigid member 54 pinching the sleeve 42 on, respectively, the one upper side and the other lower side opposite to the one side. The downwards movement of the upper pinch bar 52 is indicated by arrow 92 (FIG. 3) while arrow 94 indicates the concomitant, upwards movement of the lower pinch bar 54.

Control of fluid flow via stream 86 may be accomplished in any suitable manner and/or by the provision of any suitable control devices known to the art. Thus, typically, stream 86 flows into the cavity of container 56 via inlet pipe 96 provided with pneumatically operated control valve 98 having a controller 100. A suitable bleed or safety relief valve, not shown, may be provided to relieve the fluid pressure within container 56 when it is desired to permit the sleeve 42 to open either partially or fully; as mentioned supra, both the flexible resilient nature of the deformable sleeve 42 itself, and also fluid pressure of stream 46 working against the inner surface of sleeve 42, tend to force the sleeve 42 to an open disposition as shown in FIG. 2 so that the relief of fluid pressure within the container 56 will automatically cause the bars 52 and 54 to diverge and the valve sleeve 42 to open.

Finally, it should be mentioned that, as shown in this embodiment of the invention, the members 52 and 54 are generally rectilinear and cylindrical, and extend generally transverse to the sleeve 42. The sleeve 42 itself is preferably cylindrical, and also the container 56 is generally cylindrical in most cases and the piston head 74 is circular or disc-shaped.

It thus will be seen that there is provided a pinch valve device as an article of manufacture which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings, is to be interpreted as illustrative and not in a limiting sense. Thus, it will be understood by those skilled in the art, that although preferred and alternative embodiments have been shown and described in accordance with the Patent Statutes, the invention is not limited thereto or thereby.

Having thus described the invention, there is claimed as new and desired to be secured by Letters Patent:

1. A double acting pinch valve with floating pinch mechanism which comprises a frame, a flexible deformable resilient sleeve, said flexible deformable sleeve mounted on said frame, means to pass a fluid stream through said flexible deformable sleeve, a first rigid member on one side of said flexible deformable sleeve, a second rigid member on the other side of said flexible deformable sleeve opposite to said one side, said first and second rigid members being contiguous with said flexible deformable sleeve, said flexible deformable sleeve having an elongated axis, said first and second rigid members having parallel elongated axes with said parallel elongated axes of said first and second rigid members being perpendicular to the axis of said flexible resilient sleeve, a rectilinear rigid container, said container having an end, said end being spaced away from said flexible deformable sleeve and being closed, means rigidly connecting said container to said second rigid member, said connecting means including first and second elongated rods which are rigidly fixed relative to said container and rigidly connected to said second rigid member, said first and second rods extending through said first rigid member, means for allowing said first and second rods to move relative to said first rigid member, a piston, said piston having a head and a connecting rod, the head of said piston being mounted within said container with said connecting rod being rigidly connected to said first rigid member, said connecting rod and first and second elongated rods being parallel to each other, said means for allowing said first and second rods to move relative to said first rigid member further allowing said first rigid member to move relative to said second rigid member so that said first and second rigid members, container and piston are freely displaceable relative to said frame and toward or away from said sleeve and means to pass a fluid into said container between said closed end and said piston head so that said closed end and said piston head are both concomitantly displaceable away from each other, whereby both said container and said piston are concomitantly displaceable in opposite directions away from each other, so that both said first rigid member and said second rigid member are concomitantly displaceable toward each other in a convergence which pinches said sleeve and curtails or terminates the flow of fluid through said sleeve, said sleeve being pinched on both said one side and said other side opposite to said one side, by both said first rigid member and said second rigid member, said means for allowing said first and second rods to move relative to said first rigid member including upper and lower pairs of guide means mounted in said frame, said upper guide means mounted above said first rigid member and said lower guide means mounted below said second rigid member, said first and second rods each being received in one upper guide means and one lower guide means and floating relative thereto.

2. A double acting pinch valve according to claim 1 wherein said means for allowing said first and second rods to move relative to said first rigid member further includes bushings rigidly mounted on said first rigid member through which said first and second rods move relative to said first rigid member.

* * * * *